US008847446B2

(12) United States Patent
Maley

(10) Patent No.: US 8,847,446 B2
(45) Date of Patent: Sep. 30, 2014

(54) METHOD AND APPARATUS FOR FASTENING COOLING FANS TO ELECTRO-MECHANICAL MACHINES

(75) Inventor: David E. Maley, Anderson, IN (US)

(73) Assignee: Remy Technologies LLC, Pendleton, IN (US)

( * ) Notice: Subject to any disclaimer, the term of this patent is extended or adjusted under 35 U.S.C. 154(b) by 335 days.

(21) Appl. No.: 13/289,519

(22) Filed: Nov. 4, 2011

(65) Prior Publication Data

US 2013/0113312 A1  May 9, 2013

(51) Int. Cl.
| | | |
|---|---|---|
| H02K 9/00 | (2006.01) |
| H02K 1/22 | (2006.01) |
| H02K 15/02 | (2006.01) |
| H02K 7/00 | (2006.01) |
| H02K 9/06 | (2006.01) |
| H02K 1/28 | (2006.01) |

(52) U.S. Cl.
CPC .............. *H02K 9/06* (2013.01); *H02K 15/022* (2013.01); *H02K 1/28* (2013.01); *H02K 7/003* (2013.01)
USPC .................. 310/62; 310/63; 310/263; 29/598

(58) Field of Classification Search
CPC ........... H02K 9/06; H02K 21/12; H01R 39/00
USPC ..................... 310/62, 156.66, 156.67, 156.69, 310/156.71, 156.73, 216.114, 257, 261.1, 310/263; 416/221, 204 R; 29/598
See application file for complete search history.

(56) References Cited

U.S. PATENT DOCUMENTS

| | | | |
|---|---|---|---|
| 2,855,229 A * | 10/1958 | Winslow | 403/283 |
| 4,686,399 A * | 8/1987 | Imori et al. | 310/62 |
| 6,424,071 B1 | 7/2002 | Oohashi et al. | |
| 6,812,602 B2 | 11/2004 | York | |
| 7,057,315 B2 | 6/2006 | Ishida et al. | |
| 7,274,121 B2 | 9/2007 | Creviston et al. | |
| 2002/0101127 A1* | 8/2002 | Silva et al. | 310/231 |
| 2002/0176780 A1* | 11/2002 | Crevel | 416/204 R |
| 2004/0178697 A1* | 9/2004 | York | 310/263 |
| 2006/0197403 A1 | 9/2006 | Creviston et al. | |
| 2009/0152979 A1 | 6/2009 | Isogai | |
| 2011/0012449 A1 | 1/2011 | Hazeyama et al. | |

FOREIGN PATENT DOCUMENTS

| | | | |
|---|---|---|---|
| GB | 2282490 A | * | 4/1995 |
| KR | 1020080104771 A | | 12/2008 |
| KR | 1020100029619 A | | 3/2010 |

* cited by examiner

*Primary Examiner* — Tran Nguyen
*Assistant Examiner* — Jose Gonzalez Quinones
(74) *Attorney, Agent, or Firm* — Maginot Moore & Beck LLP

(57) ABSTRACT

A rotor arrangement for an electric machine comprises a rotor shaft and a rotor segment coupled to the rotor shaft. The rotor segment includes a main body and a collar integral with the main body. The collar includes an outer peripheral groove adjacent to the main body portion of the rotor segment. The rotor arrangement further includes a cooling fan that has a center opening defined by an inner perimeter. The center opening of the fan is configured to slidably engage the collar and is adjustable between an insertion diameter and a locking diameter. When the center opening is at the locking diameter, at least a portion of the inner perimeter of the fan extends into the outer peripheral groove in the collar such that the fan is retained on the rotor segment.

20 Claims, 7 Drawing Sheets

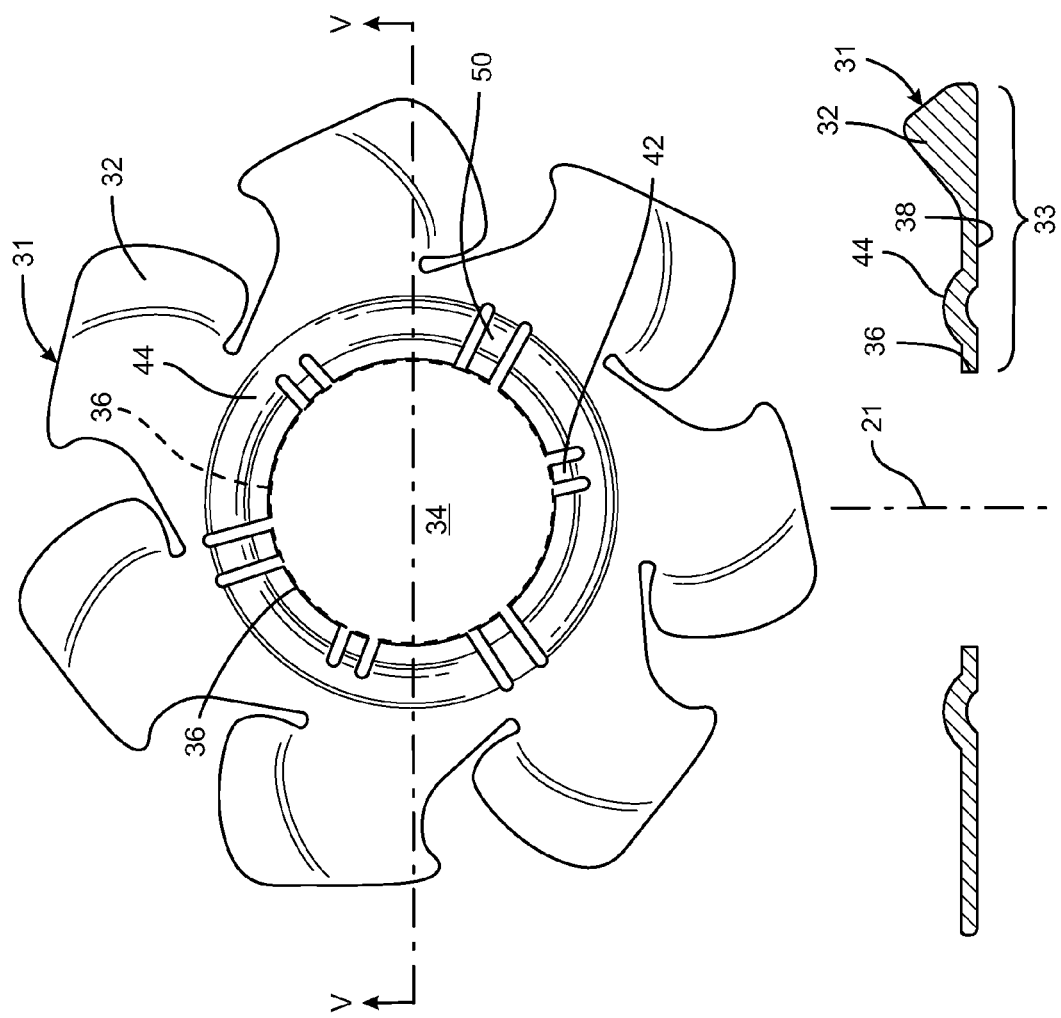

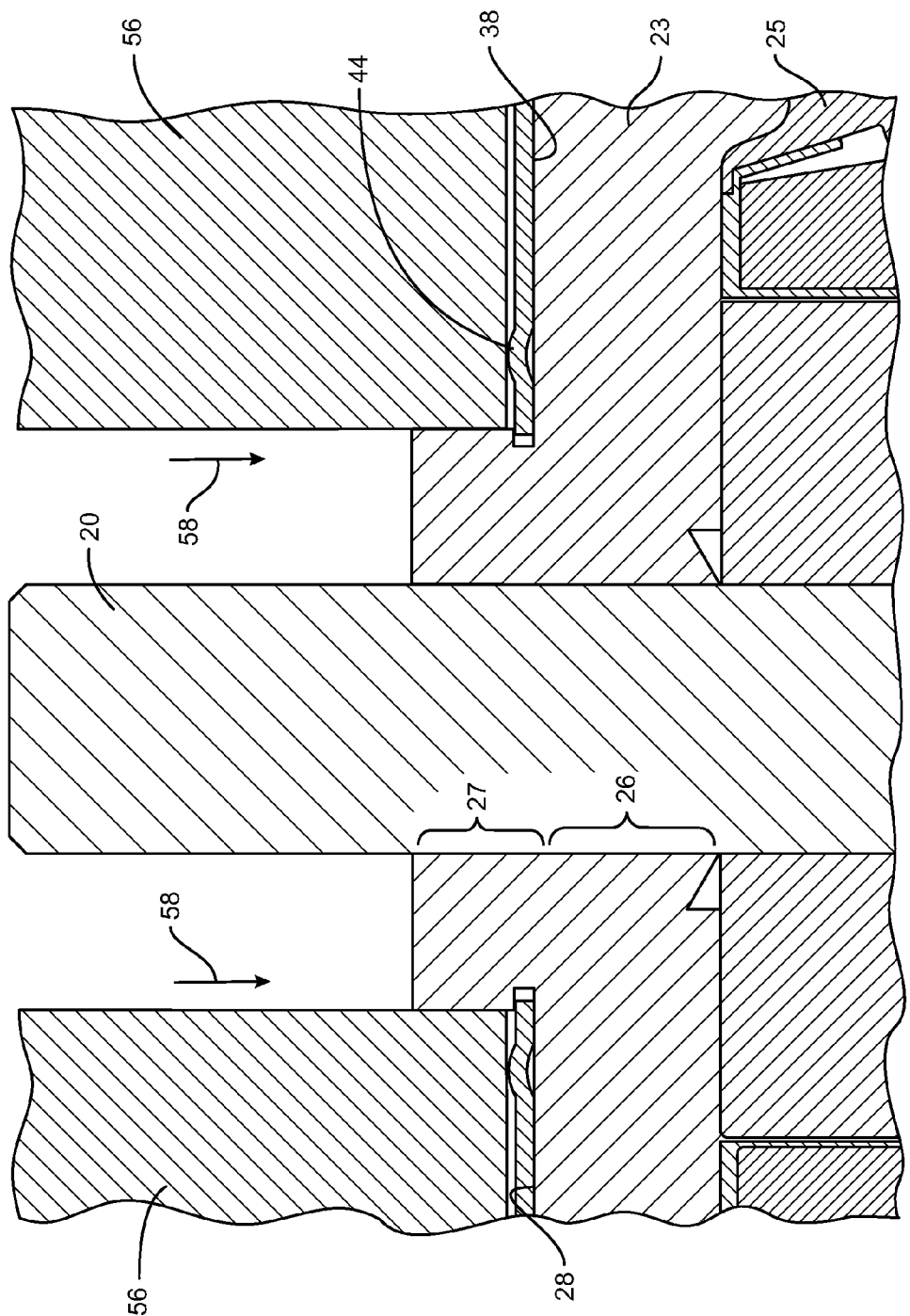

METHOD AND APPARATUS FOR FASTENING COOLING FANS TO ELECTRO-MECHANICAL MACHINES

FIELD

This application relates to the field of vehicle electric systems and more particularly, to fastening internal cooling fans to an electro-mechanical machine, such as an alternator.

BACKGROUND

Alternators are used to convert mechanical energy from a vehicle engine into electrical energy for the vehicle. The electrical energy produced by the alternator is used to charge the vehicle battery, and may also be used to power electric loads on the vehicle.

The alternator generally includes a rotatable field coil positioned on a rotor. The rotor is rotably positioned within a stator having a plurality of stator windings. Operation of the engine results in rotation of the rotor and the field coil. Current flowing through the rotating field coil results in a related current induced in the stator windings. Current flowing through the stator windings provides an output voltage that is rectified and delivered to the vehicle battery and/or electric loads on the vehicle.

Modern vehicle alternators include a regulator that controls the current through the field coil. When more current is provided to the field coil, the output of the alternator increases. When less current is provided to the field coil, the output of the alternator decreases.

Several different rotating electro-mechanical machine designs exist. One common design is the Lundell, or "claw-pole," design. The claw-pole design is often used for dynamo-electric machines, such as alternators. In a claw-pole machine, the rotor includes claw-shaped pole segments (usually a pair of segments) located around one or more field windings. The pole segments have claw-shaped magnetic poles with poles on opposing segments interleaved in a meshing relationship.

Given the thermal conditions in which claw-pole machines often operate, proper cooling is vital to ensure proper and prolonged operation. Internal cooling fans are commonly used to cool claw-pole machines. Internal cooling fans are usually attached to the pole segments by welding or frictional clamping.

Conventional internal cooling fan attachment techniques are sometimes deficient in a variety of aspects. With conventional techniques, the choice of internal cooling fan material is restricted. For example, in order to weld a fan to a pole segment, the fan must be formed from a suitable material. It would therefore be advantageous to provide an attachment technique that expands the range of suitable materials used to form the fan.

Further, conventional attachment systems may be prone to fatigue and/or failure. Clamps and welds may degrade and eventually fail during prolonged operation. Moreover, when a fan is held to a segment through friction or welding, varnish from the field windings may wick in between the fan and the segment and be clamped upon in the assembly process. Because varnish has a low yield point in the typical alternator operating temperature range, it may yield to the pressure of the clamped assembly and the assembly may become loose. Thus, attachment methods providing increased durability over prolonged operation are also desired.

SUMMARY

A rotor arrangement for an electric machine for a vehicle comprises a rotor shaft and a rotor segment coupled to the rotor shaft. The rotor segment includes a main body portion and a collar integral with the main body portion. The collar includes an outer peripheral groove. The rotor arrangement further includes a fan that has a center opening defined by an inner perimeter. At least a portion of the inner perimeter of the fan extends into the outer peripheral groove in the collar such that the fan is retained on the rotor segment.

Pursuant to another embodiment of the disclosure, there is provided a method of assembling a rotor arrangement for an electric machine. The method includes inserting a fan onto a rotor segment such that the rotor segment extends through a center opening of the fan. The rotor segment includes an outer peripheral groove. The fan includes an inner perimeter defining the center opening and at least one contoured surface adjacent to the inner perimeter. The method further includes reforming the contoured surface such that at least a portion of the inner perimeter of the fan extends into the outer peripheral groove of the rotor segment.

In accordance with yet another embodiment of the disclosure, a rotor arrangement for an electro-mechanical machine comprises a rotor shaft extending axially and being rotable within the machine. The rotor shaft defines a shaft axis about which the rotor arrangement rotates. The rotor arrangement further includes a collar disposed about and extending axially along the rotor shaft. The collar includes a substantially flat surface extending perpendicular to the shaft axis and an outer peripheral groove adjacent to the substantially flat surface. The rotor arrangement further includes a fan having a center opening defined by an inner perimeter. The fan is disposed about the collar with the inner perimeter adjacent to the peripheral groove. The center opening of the fan is adjustable between an insertion diameter and a locking diameter that is less than the insertion diameter. The inner perimeter of the fan extends into the outer peripheral groove in the collar such that the fan is retained on the rotor shaft.

The above described features and advantages, as well as others, will become more readily apparent to those of ordinary skill in the art by reference to the following detailed description and accompanying drawings. While it would be desirable to provide an electric machine that provides one or more of these or other advantageous features as may be apparent to those reviewing this disclosure. The teachings disclosed herein extend to those embodiments which fall within the scope of the appended claims, regardless of whether they accomplish one or more of the above-mentioned advantages.

BRIEF DESCRIPTION OF THE DRAWINGS

FIG. 4 shows a top view of an embodiment of the cooling fan of FIG. 2.

FIG. 5 shows a cross-sectional view of the fan along line V-V of FIG. 4.

FIG. 6A shows a cross-sectional view of the rotor arrangement of FIG. 2 with a press engaging a contoured surface of the fan to attach the fan to the rotor shaft.

DESCRIPTION

Figure 1:
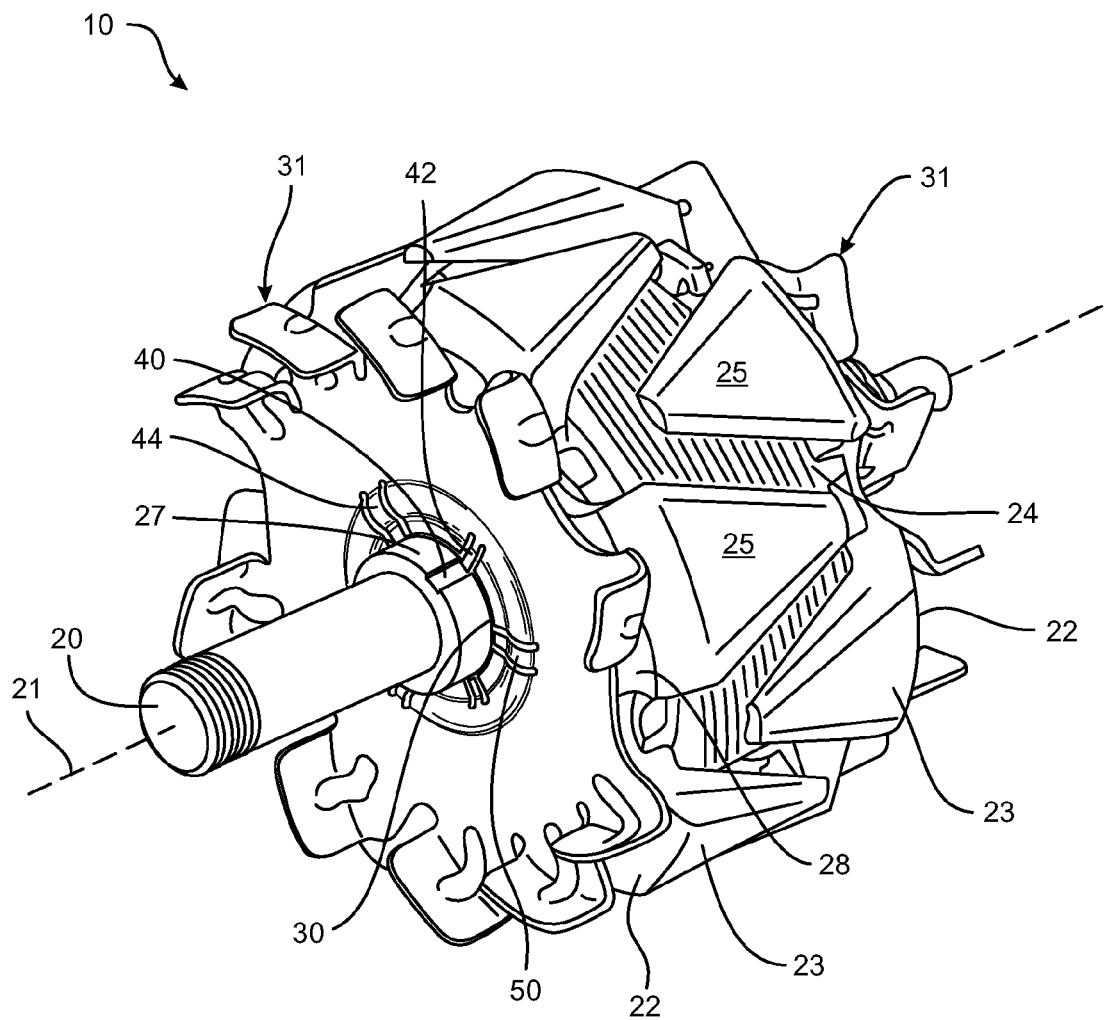
FIG. 1 shows an isometric view of a rotor arrangement for an electric machine as disclosed herein.

With reference to FIG. 1, a rotor arrangement 10 that may be used in an alternator is shown. The arrangement includes a rotor segment 22 and one or more field windings 24. The rotor segment 22 is shown as a claw-pole segment 23, although other rotor segment configurations may be used. The claw-pole segments 23 (usually a pair of segments) are located around the one or more field windings 24. The claw-pole segments 23 have a plurality of claw-shaped magnetic poles or claws 25 and are affixed around the one or more windings 24 such that the claws 25 mesh together.

Figure 2:
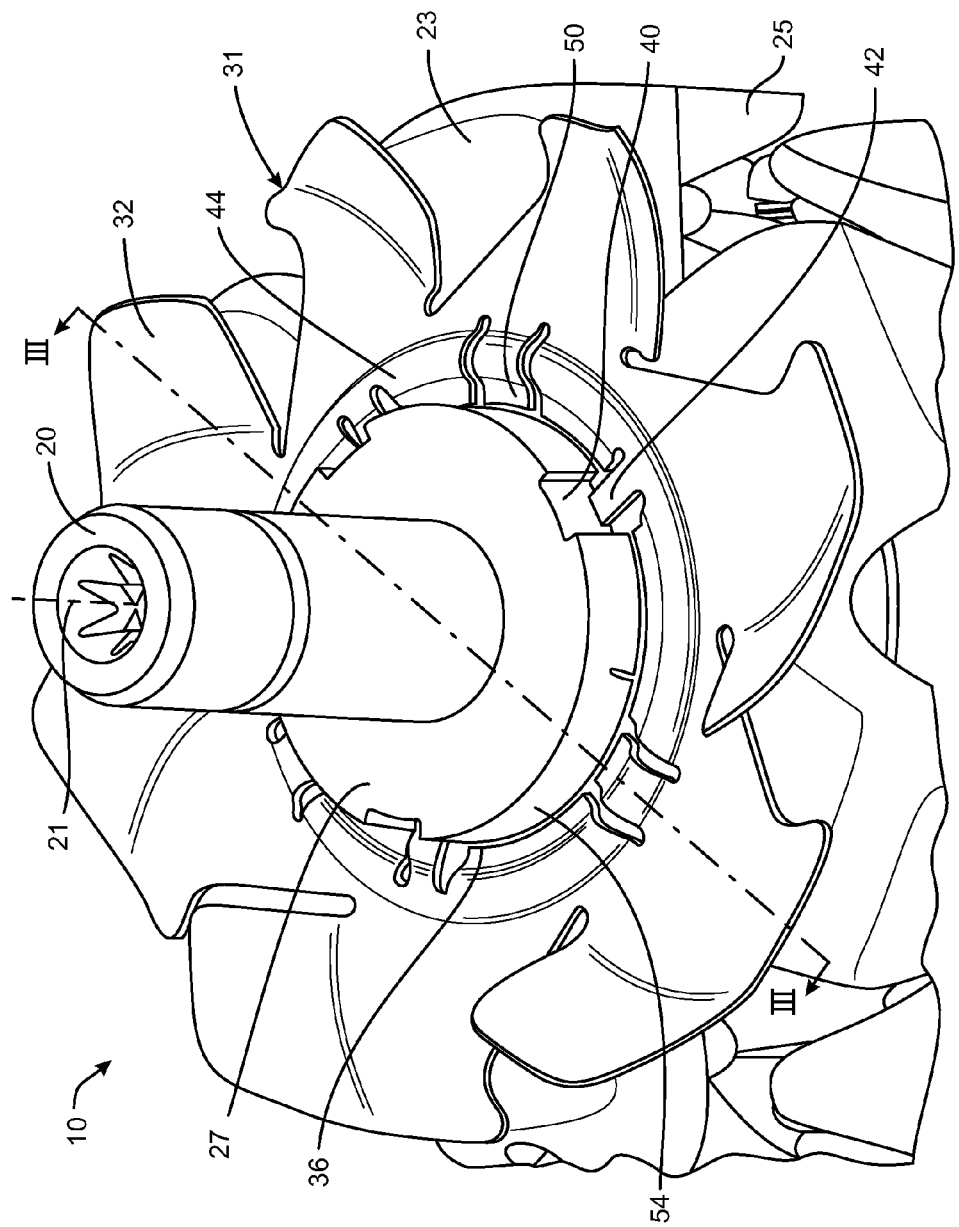
FIG. 2 shows an enlarged isometric view of the rotor arrangement of FIG. 1 prior to final attachment of a fan to a rotor shaft.

With reference to FIGS. 1 and 2, in at least one embodiment the claw-pole segment 23 is coupled to a rotor shaft 20. The rotor shaft 20 defines a shaft axis 21 about which the rotor shaft 20 rotates within the machine. The coupling of the claw-pole segment 23 to the rotor shaft 20 may be accomplished by any known coupling method, such as by a simple interference or press fit between the rotor shaft 20 and the claw-pole segment 23 or by use of a knurl (not shown) on the rotor shaft 20.

Figure 3:
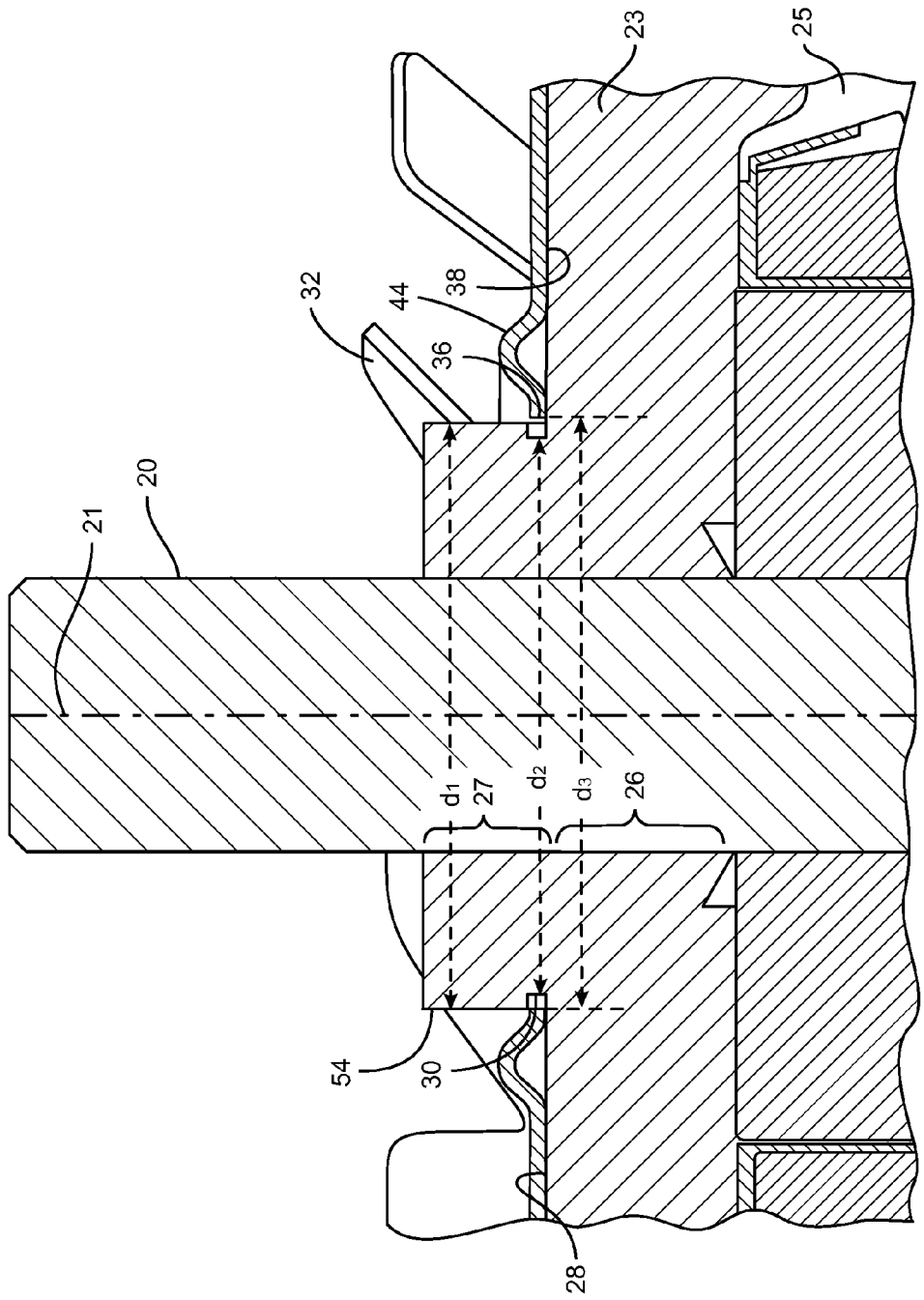
FIG. 3 shows a cross-sectional view of the rotor arrangement taken along a plane extending through line III-III of FIG. 2.

With reference to FIGS. 1 and 3, the claw-pole segment 23 includes a main body portion 26 and a collar 27 integral with the main body portion 26. The main body portion 26 includes a substantially flat surface 28 that extends perpendicular to the shaft axis 21. The plurality of claws 25 of the claw-pole segment 23 are integral with the flat surface 28 of the main body portion 26 and extend parallel to the shaft axis 21.

The collar 27 includes an outer peripheral groove 30 located adjacent to the substantially flat surface 28 of the main body portion 26. In the embodiments of FIGS. 1-3, the outer peripheral groove 30 is an annular groove that is substantially continuous about the collar portion 27. While the embodiment shown depicts the peripheral groove 30 as substantially circular, it will be recognized that other geometries for the groove 30 are also possible. For example, the cross-sectional geometry of the peripheral groove 30 in a direction perpendicular to the shaft axis 21 may be a circle, square, rectangle, triangle, or any oblong geometry of these or other shapes.

The integration of the collar 27 with the main body portion 26 may be accomplished in a number of ways. In one embodiment, the main body portion 26 of the claw-pole segment 23 and the collar 27 are formed from the same physical body of material. In another embodiment, the main body portion 26 and the collar 27 are physically separate components of the rotor arrangement 10 but are immediately adjacent to one another. In yet another embodiment, the main body portion 26 and the collar 27 are physically separate components but are configured to interlock with one another, meaning at least one of the main body portion 26 or the collar 27 slidably overlaps and engages the other.

With reference to FIGS. 2, 4, and 5, the rotor arrangement 10 further includes a fan 31. The fan 31 includes a plurality of blades 32, a center opening 34 defined by an inner perimeter 36, and a central support base 33 substantially surrounding the inner perimeter 36. In the embodiments of FIGS. 2, 4, and 5, the inner perimeter 36 is annular, such that it forms a loop along an inner edge of the fan. In a plurality of other embodiments, the inner perimeter 36 may merely comprise edges, such as two or more opposing edges. Additionally, in the embodiments of FIGS. 2, 4, and 5, the annular inner perimeter is broken and discontinuous. However, in other embodiments, it will be recognized that the annular perimeter may be more or less continuous than that disclosed herein. Furthermore, in the embodiments of FIGS. 2, 4, and 5, the inner perimeter 36 is substantially circular. While the embodiment shown depicts the inner perimeter 36 as substantially circular, other geometries for the inner perimeter 36 are possible. For example, the cross-sectional geometry of the inner perimeter 36 in a direction perpendicular to the shaft axis 21 may be a circle, square, rectangle, triangle, or any oblong geometry of these or other shapes. In at least one embodiment, the peripheral groove 30 of the collar 27 and the inner perimeter 36 of the fan 31 have similar geometries in the direction perpendicular to the shaft axis 21.

Figure 6B:
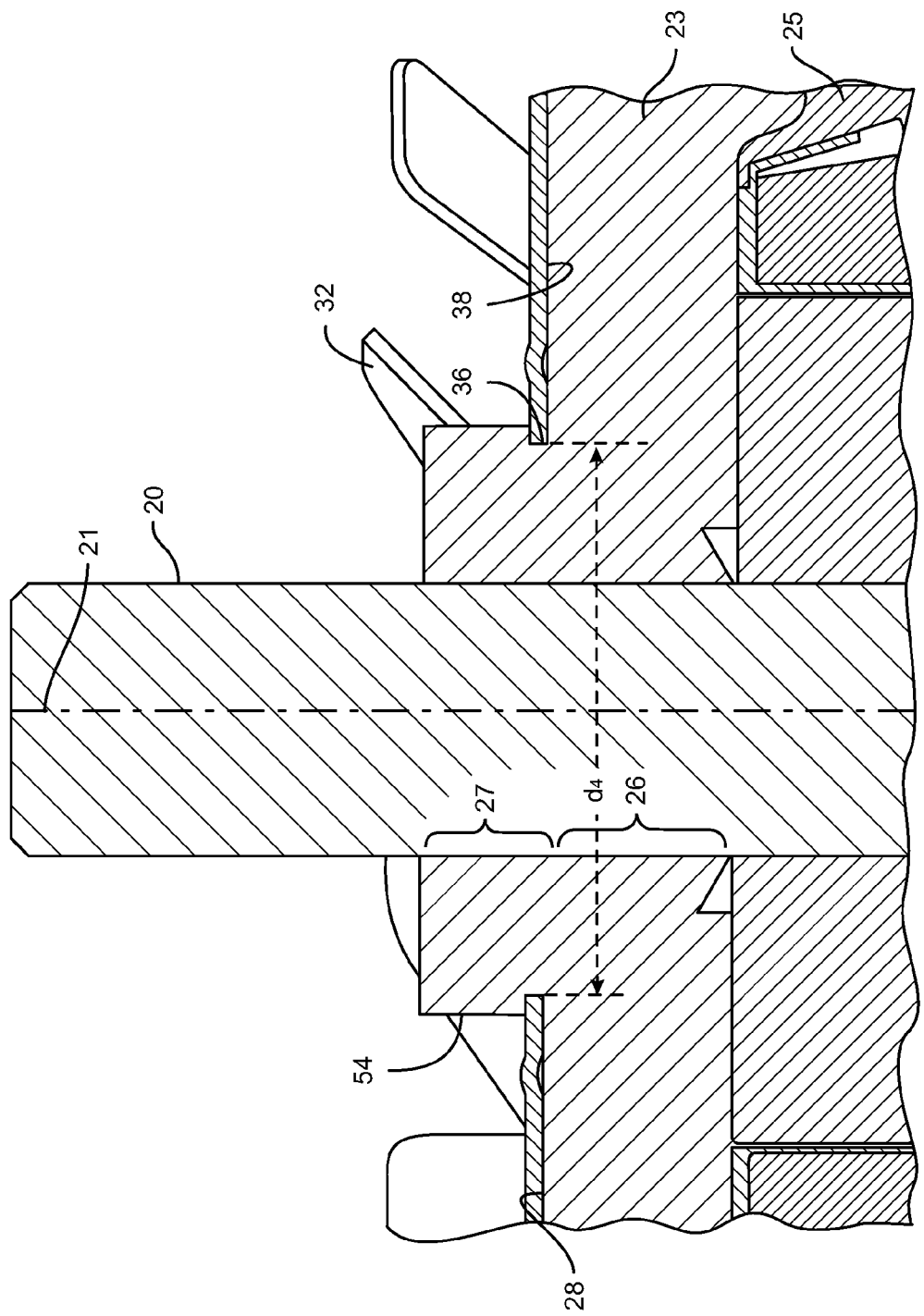
FIG. 6B shows a cross-sectional view of the rotor arrangement of FIG. 2 after final attachment of the fan to the rotor shaft.

With reference to FIGS. 3, 5, and 6B, the central support base 33 includes a substantially flat surface 38 that substantially surrounds the inner perimeter 36 and extends in a direction perpendicular to the shaft axis 21. With reference to FIG. 6B, in one embodiment at least a portion of the inner perimeter 36 of the fan 31 is configured to extend into the outer peripheral groove 30 of the collar 27 when the substantially flat surfaces 28, 38 of the fan 31 and the claw-pole segment 23 are adjacent. The inner perimeter 36 extends into the outer peripheral groove 30 in such a way that the fan 31 is retained on the claw-pole segment 23 between the collar 27 and the main body portion 26 of the claw-pole segment 23.

With reference to FIGS. 3, 4, and 5, the central support base 33 further includes at least one contoured surface 44 between the inner perimeter 36 and the substantially flat surface 38. In one embodiment, the contoured surface 44 is a convex surface that extends in the axial direction away from the substantially flat surface 28 of the main body portion 26 of the claw pole segment 23. Although the exemplary embodiment shows the contoured surface 44 as a convex surface, other contoured surface geometries are possible, such as concave and triangular surfaces.

With reference to FIGS. 2 and 4, a portion of the central support base 33 is segmented into a plurality of retaining fingers 50 and at least one detent 42. In this embodiment, the contoured surface 44 passes through the retaining fingers 50 and the at least one detent 42. With reference to FIGS. 3 and 6B, the retaining fingers 50 are configured to adjust the center opening 34 of the fan 31 between an insertion diameter $d_3$ and a locking diameter $d_4$ that is less than the insertion diameter $d_3$.

With reference to FIGS. 2, 3, and 6B, the collar 27 further includes an outer perimeter 54 having a diameter $d_1$ that is less than the insertion diameter $d_3$ and greater than the locking diameter $d_4$. The outer peripheral groove 30 of the collar 27 defines a grove diameter $d_2$ that is less than the locking diameter $d_4$. Although the outer perimeter 54, the center opening 34, and the outer peripheral groove 30 have been described with associated diameters $d_1$, $d_2$, $d_3$, $d_4$, the term "diameter" is not meant to limit the geometries of these elements to any one shape, such as a circle or an oval. Accordingly, the term "diameter" as used herein is intended to refer to a maximum distance across generally opposing surfaces.

The diameter of the outer perimeter 54, the diameter of the outer peripheral groove 30, and the insertion and locking diameters defined by the retaining fingers 50 are configured to enable the fan 31 to slidably engage the collar 27 during assembly of the fan 31 to the claw-pole segment 23. Moreover, when the substantially flat surfaces 28, 38 of the fan 31 and the claw-pole segment 23 are adjacent, these diameters are configured to retain the fan 31 on the claw-pole segment 23 after assembly of the fan 31 to the claw-pole segment 23.

With reference to FIGS. 1 and 2, the collar 27 further includes at least one recess 40 that extends along the collar 27 in a direction parallel to the shaft axis 21. The at least one detent 42 of the fan 31 extends into the at least one recess 40 of the collar 27 for locating the fan 31 about the collar 27 and for providing a locking feature for the fan on the collar (i.e., a feature that prevents slipping of fan relative to the rotor segment 23 and collar 27 due to the rotational momentum of the fan 31 and collar). Although the embodiment shown depicts the at least one recess 40 and the at least one detent 42 as the only locating and rotational locking feature on the rotor arrangement 10, alternative or additional locating and rotational locking features may be provided. For example, in alternative or addition to the at least one recess and detent 40, 42, the outer peripheral groove 30 and the inner perimeter 36 may be configured with matching geometries to locate and rotationally limit the fan 31 about the collar 27. It will also be recognized that the at least one detent 42 and the at least one recess 40 may be reversed such that the fan 31 includes a recess (not shown) and the collar 27 includes a detent (not shown).

Figure 7:
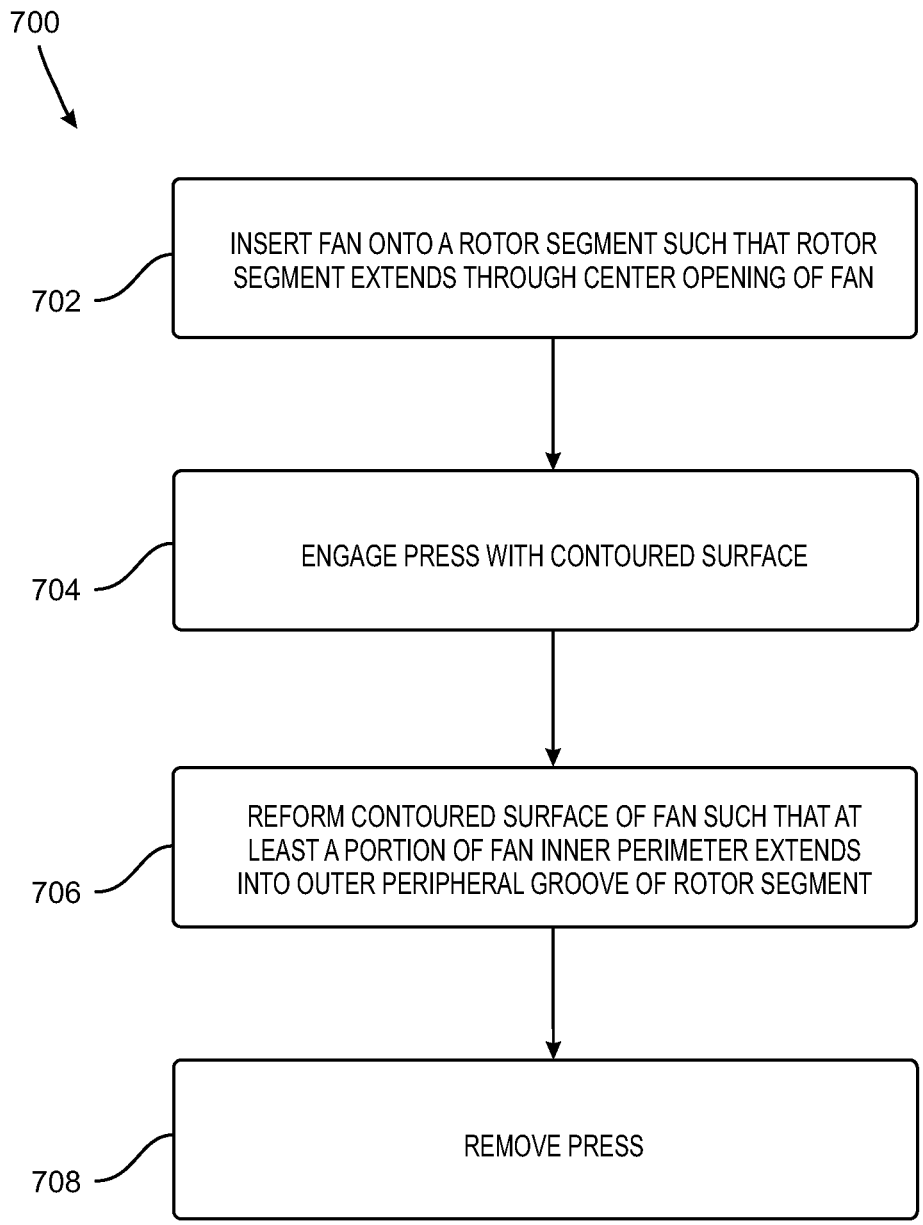
FIG. 7 shows a flowchart of a method for fastening the cooling fan to the rotor arrangement.

With reference to FIG. 7, a flowchart of a method 700 for fastening a cooling fan to a rotor segment of an electric machine is shown. Method 700 begins by inserting a fan 31 onto a rotor segment 22 such that the rotor segment 22 extends through a center opening 34 of the fan (step 702). The rotor segment 22 includes a main body 26 adjacent to a collar 27. The main body 26 includes a substantially flat surface 28 that is substantially perpendicular to an axis 21 defined by a rotor shaft 20. The rotor segment 23 further includes an outer peripheral groove 30 that is provided in the collar 27. The fan 31 includes a plurality of blades 32, an inner perimeter 36 defining the center opening 34, a substantially flat surface 38 substantially surrounding the inner perimeter 36, and at least one contoured surface 44 between the inner perimeter 36 and the substantially flat surface 38. In at least one embodiment of step 702, the contoured surface 44 is a convex surface extending in the axial direction away from the substantially flat surface 28 of the main body 26 of the rotor segment 22. However, as noted above, the contoured surface 44 may be any of number of different geometries.

Method 700 continues by engaging a press 56 as shown in FIG. 6A with the contoured surface 44 of the fan 31 to reform the contoured surface 44 (step 704). In operation, engaging the press 56 with the contoured surface 44 includes transforming the contoured surface 44 into a flatter surface. The contoured surface 44 is reformed such that at least a portion of the inner perimeter of the fan 31 extends into the outer peripheral groove 30 of the rotor segment 22 (step 706). In at least one embodiment of step 706, applying the press 56 to the contoured surface 44 in the direction of arrows 58 forces the fan 31 against the substantially flat surface 28 of the rotor segment 22 such that the contoured surface 44 is substantially flattened between the press 56 and the rotor segment 22. Once the contoured surface 44 has been reformed and the fan 31 is retained on the rotor segment 22, the press 56 is removed (step 708).

Although the present invention has been described with respect to certain exemplary embodiments, it will be appreciated by those of skill in the art that other implementations and adaptations are possible. For example, the previous embodiments depict the main body 26 of the claw-pole segment 23 as including the substantially flat surface 28. However, in an alternative embodiment, the substantially flat surface 28 is now associated with the collar 27. The substantially flat surface (not shown) of the collar 27 extends from the collar in a direction perpendicular to the shaft axis. In this embodiment, the interaction between the inner perimeter 36 of the fan 31 and the outer peripheral groove 30 of the collar 27 remains the same as described above. However, the substantially flat surface 38 of the fan 31 is now adjacent to the substantially flat surface (not shown) of the collar 27.

Moreover, there are advantages to individual advancements described herein that may be obtained without incorporating other aspects described above. Therefore, the spirit and scope of the appended claims should not be limited to the description of the preferred embodiments contained herein.

What is claimed is:

1. A rotor arrangement for an electric machine comprising:
    a rotor shaft defining an axial direction;
    a rotor segment coupled to the rotor shaft, the rotor segment including a main body portion and a collar integral with the main body portion such that the collar is not insertable on the rotor shaft in the axial direction separate from the main body portion, the collar including an outer peripheral groove; and
    a fan including a center opening defined by an inner perimeter, wherein at least a portion of the inner perimeter of the fan extends into the outer peripheral groove in the collar such that the fan is retained on the rotor segment.

2. The rotor arrangement of claim 1 wherein the outer peripheral groove in the collar is an annular groove.

3. The rotor arrangement of claim 2 wherein the annular groove is substantially circular, and wherein the inner perimeter of the fan is substantially circular.

4. The rotor arrangement of claim 1 wherein the rotor segment is a claw-pole segment, and wherein the fan includes a deformed portion surrounding the outer peripheral groove.

5. The rotor arrangement of claim 4 wherein the main body of the claw-pole segment includes a substantially flat surface extending perpendicular to a shaft axis defined by the rotor shaft, and wherein the annular groove is adjacent to the substantially flat surface, and wherein the fan is retained on the rotor segment between the collar and the main body of the claw-pole segment.

6. The rotor arrangement of claim 5 wherein the fan includes a substantially flat surface substantially surrounding the inner perimeter of the fan, wherein the substantially flat surface of the fan is adjacent to the substantially flat surface of the claw-pole segment.

7. The rotor arrangement of claim 1 wherein the collar further includes at least one recess extending in the axial direction defined by the rotor shaft, and wherein the fan further includes at least one detent extending into the at least one recess.

8. A method of assembling a rotor arrangement for an electric machine comprising:
    inserting a fan onto a rotor segment such that the rotor segment extends through a center opening of the fan, the rotor segment including an outer peripheral groove, and the fan including an inner perimeter defining the center opening and at least one contoured surface adjacent to the inner perimeter;
    reforming the contoured surface such that at least a portion of the inner perimeter of the fan extends into the outer peripheral groove of the rotor segment.

9. The method of claim 8 wherein reforming the contoured surface includes transforming the contoured surface into a flatter surface.

10. The method of claim 9 wherein the rotor segment includes a main body adjacent to a collar, the outer peripheral groove of the rotor segment provided in the collar, and the main body including a substantially flat surface that is substantially perpendicular to an axis defined a rotor shaft.

11. The method of claim 10 wherein the contoured surface is a convex surface extending outward from the substantially flat surface of the main body of the rotor segment.

12. The method of claim 8 wherein reforming the contoured surface includes applying a press to the contoured surface such that the portion of the inner perimeter of the fan is forced into the outer peripheral groove in the rotor segment.

13. The method of claim 12 wherein applying the press to the contoured surface forces the fan against a substantially flat surface of the rotor segment such that the contoured surface is substantially flattened between the press and the substantially flat surface of the rotor segment.

14. The method of claim 8 wherein the rotor segment includes a collar coupled to a rotor shaft.

15. The method of claim 14 wherein inserting the fan onto the rotor segment includes sliding detents on the inner perimeter of the fan within axial grooves on the collar.

16. The method of claim 8 further comprising inserting the rotor segment on to a rotor shaft.

17. A rotor arrangement for an electro-mechanical machine comprising:
 a rotor shaft extending axially and being rotatable within the machine, the rotor shaft defining a shaft axis;
 a collar disposed about and extending axially along the shaft, the collar including a substantially flat surface extending perpendicular to the shaft axis and an outer peripheral groove adjacent to the substantially flat surface;
 a fan having a center opening defined by an inner perimeter, the fan being disposed about the collar with the inner perimeter adjacent to the peripheral groove, the center opening being adjustable between an insertion diameter and a locking diameter that is less than the insertion diameter; and
 wherein the inner perimeter of the fan extends into the outer peripheral groove in the collar such that the fan is retained on the rotor shaft.

18. The rotor arrangement of claim 17 wherein the collar has an outer perimeter with a diameter that is less than the insertion diameter and greater than the locking diameter, and wherein the peripheral groove is an annular groove defining a groove diameter that is less than the locking diameter.

19. The rotor arrangement of claim 17 wherein the fan includes a central support base substantially surrounding the inner perimeter, wherein the central support base is segmented into a plurality of retaining fingers and at least one detent, and wherein the retaining fingers define both the insertion and locking diameters of the center opening.

20. The rotor arrangement of claim 19 wherein the central support base further includes a contoured surface passing through the retaining fingers and the at least one detent and extending away from the substantially flat surface of the collar, and wherein the collar further includes at least one recess extending along the collar and parallel to the shaft axis, and wherein the at least one detent extends into the at least one recess.

* * * * *